(12) United States Patent
Friedrich

(10) Patent No.: US 9,980,339 B2
(45) Date of Patent: May 22, 2018

(54) ILLUMINATION DEVICE

(71) Applicant: OSRAM GmbH, Munich (DE)

(72) Inventor: Juergen Friedrich, Hattersheim (DE)

(73) Assignee: OSRAM GMBH, Munich (DE)

( * ) Notice: Subject to any disclaimer, the term of this patent is extended or adjusted under 35 U.S.C. 154(b) by 0 days. days.

(21) Appl. No.: 15/202,605

(22) Filed: Jul. 6, 2016

(65) Prior Publication Data

US 2017/0027038 A1   Jan. 26, 2017

(30) Foreign Application Priority Data

Jul. 24, 2015   (DE) .................. 10 2015 214 090

(51) Int. Cl.
| H05B 37/02 | (2006.01) |
| H05B 33/08 | (2006.01) |
| B60Q 1/00  | (2006.01) |

(52) U.S. Cl.
CPC ....... H05B 33/0887 (2013.01); B60Q 1/0094 (2013.01); H05B 33/083 (2013.01); H05B 33/0842 (2013.01)

(58) Field of Classification Search
CPC .............. H05B 33/0854; H05B 33/089; H05B 33/083; H05B 33/0842; H05B 33/0887; B60Q 1/0094
USPC ......................................................... 315/77
See application file for complete search history.

(56) References Cited

U.S. PATENT DOCUMENTS

| 5,939,839 A * | 8/1999 | Robel ............... H05B 33/0884 |
| | | 315/119 |
| 9,538,592 B2* | 1/2017 | Radermacher ..... H05B 33/0815 |
| 2008/0224636 A1* | 9/2008 | Melanson .......... H05B 33/0815 |
| | | 315/307 |
| 2011/0273102 A1* | 11/2011 | van de Ven ........ H05B 33/0809 |
| | | 315/193 |
| 2013/0127353 A1* | 5/2013 | Athalye ............. H05B 33/0815 |
| | | 315/193 |
| 2014/0159586 A1* | 6/2014 | Kido .................... H04B 10/116 |
| | | 315/151 |
| 2014/0218953 A1* | 8/2014 | Ungru ................ H05B 33/0824 |
| | | 362/545 |
| 2014/0232268 A1* | 8/2014 | Kamoi ............... H05B 33/0854 |
| | | 315/117 |
| 2015/0123549 A1* | 5/2015 | Radermacher ..... H05B 33/0848 |
| | | 315/185 R |
| 2015/0145437 A1* | 5/2015 | Limmer ............. H05B 33/0848 |
| | | 315/297 |
| 2016/0081145 A1* | 3/2016 | Peeters .............. H05B 33/0827 |
| | | 315/185 R |
| 2016/0242254 A1* | 8/2016 | Baccarin ............... F21S 48/215 |

* cited by examiner

*Primary Examiner* — Don Le
(74) *Attorney, Agent, or Firm* — Viering Jentschura & Partner MBB

(57) ABSTRACT

An illumination apparatus for a motor vehicle is provided. The illumination device may include at least one semiconductor light source arrangement, and means for regulating or controlling the supply current for the at least one semiconductor light source arrangement, the means having at least one resistance element with a temperature-dependent resistance value.

8 Claims, 5 Drawing Sheets

ILLUMINATION DEVICE

CROSS-REFERENCE TO RELATED APPLICATION

This application claims priority to German Patent Application Serial No. 10 2015 214 090.3, which was filed Jul. 24, 2015, and is incorporated herein by reference in its entirety.

TECHNICAL FIELD

Various embodiments relate generally to an illumination device.

SUMMARY

An illumination apparatus for a motor vehicle is provided. The illumination device may include at least one semiconductor light source arrangement, and means for regulating or controlling the supply current for the at least one semiconductor light source arrangement, the means having at least one resistance element with a temperature-dependent resistance value.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

Various embodiments provide an improved illumination device which can be operated from the vehicle electrical system voltage of a motor vehicle.

Various embodiments relates, for example, to an illumination device which can be operated from the vehicle electrical system voltage of a motor vehicle and has a circuit for protecting electrically operated semiconductor light sources for signaling and illumination purposes.

The illumination device according to various embodiments may be used in the front and rear lights in automotive technology. The semiconductor light sources of the illumination device according to various embodiments should be protected from positive and negative voltage spikes. Such voltage spikes may be produced during a load change, during disconnection of the battery and bridging from another vehicle. At least one suppressor diode may be provided for protecting against voltage spikes. The current may be regulated via at least one resistance element having a temperature-dependent resistance value.

Figure 1:
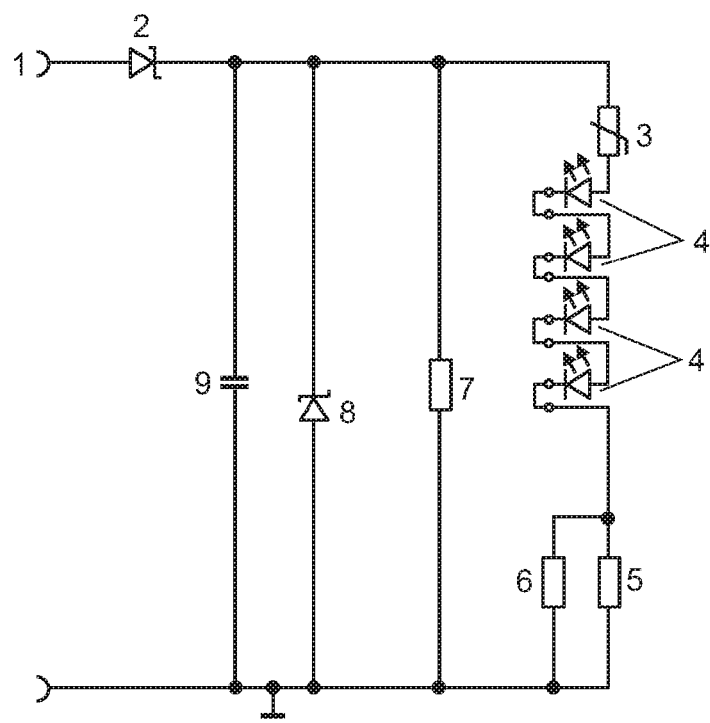
FIG. 1 shows a schematic circuit diagram of an illumination device according to the first embodiment.

The illumination device according to a first embodiment has a semiconductor light source arrangement consisting of four light-emitting diodes 4 connected in series. A schematic circuit diagram of the illumination device of the first embodiment is depicted in FIG. 1. The illumination device is operated from the vehicle electrical system voltage of a motor vehicle. It is designed for supply voltages in the range of 6 V to 16 V DC. The reference symbol 1 denotes the positive connection of the motor vehicle electrical system voltage source in the figures. The negative connection of the motor vehicle electrical system voltage source or the connection at ground potential is not provided with a reference symbol in the figures.

So that the light-emitting diodes of the semiconductor light source arrangement 4 are protected against a positive overvoltage and a high temperature, a resistance element 3 which has a temperature-dependent resistance value and limits the current through the light-emitting diodes is connected upstream of the semiconductor light source arrangement 4. The resistance element 3 is in the form of a PTC thermistor.

The illumination device additionally comprises a parallel circuit of two resistors 5, 6 which is connected in series with the series circuit of the semiconductor light source arrangement 4 and the PTC thermistor 3.

A desired nominal current for the semiconductor light source arrangement of the illumination device is defined by suitably dimensioning the resistance values of the resistors 5, 6 and of the PTC thermistor 3. In the case of an increased operating temperature, the resistance value of the PTC thermistor 3 increases, as a result of which the current through the PTC thermistor 3 and therefore also through the light-emitting diodes of the semiconductor light source arrangement which are connected in series therewith is limited.

A diode 2 at the voltage input 1 of the illumination device protects the circuit and the illumination device from major damage in the event of polarity reversal, that is to say if the illumination device is mounted with interchanged electrical connections. The diode 2 protects the light-emitting diodes of the semiconductor light source arrangement 4 from voltages with a negative polarity of up to approximately 600 V. A capacitor 9, in conjunction with a suppressor diode 8 (also referred to as a transorb diode), attenuates any voltage spikes and limits them to a permanently set value.

The suppressor diode 8 is connected in parallel with the series circuit consisting of the PTC thermistor 3, the semiconductor light source arrangement 4 and the parallel circuit of the resistors 5, 6.

The capacitor 9 is connected in parallel with the series circuit consisting of the PTC thermistor 3, the semiconductor light source arrangement 4 and the parallel circuit of the resistors 5, 6. The capacitor 9 is also connected in parallel with the suppressor diode 8.

As a result, the light-emitting diodes of the semiconductor light source arrangement 4 are protected from excessive voltage and excessive current and from a high temperature.

The flow of current through a resistor 7 signals, to a control device (not depicted), the presence of the illumination device and the defect in one or more light-emitting diodes of the semiconductor light source arrangement. The resistor 7 is connected in parallel with the series circuit consisting of the PTC thermistor 3, the semiconductor light source arrangement 4 and the parallel circuit of the resistors 5, 6.

Figure 2:
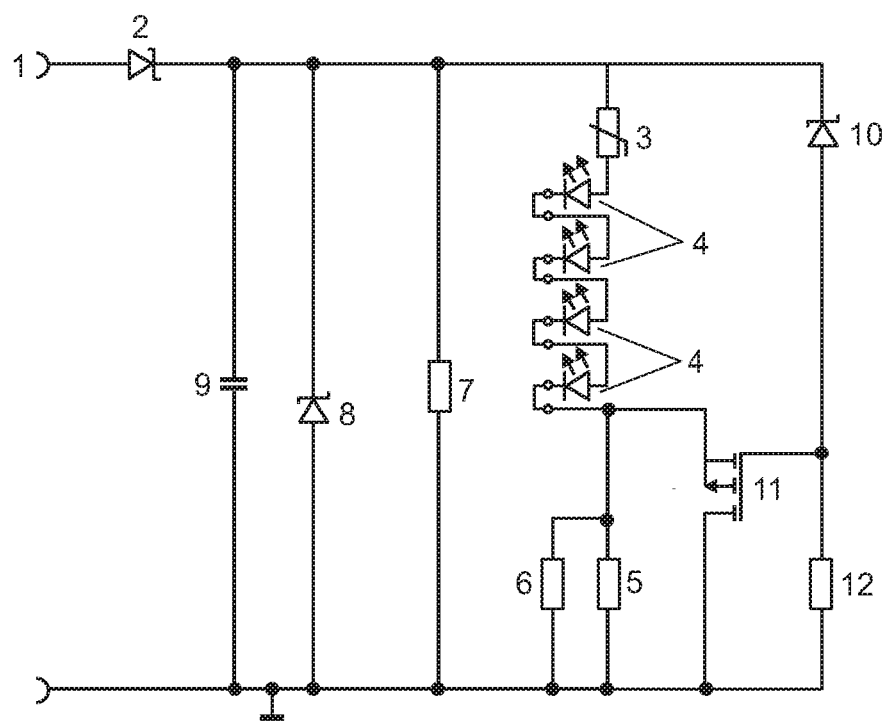
FIG. 2 shows a schematic circuit diagram of an illumination device according to the second embodiment.

A circuit as shown in FIG. 2 according to the illumination device in accordance with the second embodiment has the same function as that in FIG. 1. A MOSFET (Metal Oxide Semiconductor Field Effect Transistor) 11 which bridges the resistors 5, 6 on the basis of the voltage drop across the Zener diode 10 is additionally provided. In the case of an input voltage or supply voltage below the forward voltage of the light-emitting diodes 4, the resistors 5, 6 are bridged using the MOSFET 11 and the Zener diode 10. As a result, the light-emitting diodes 4 can also be operated with a greatly reduced input voltage. This function is required in the so-called start/stop function in automotive technology in which the engine of the vehicle is switched off when stopped in front of a red traffic light. The input voltage can fall to 6 V as a result of the start/stop function.

Figure 3:
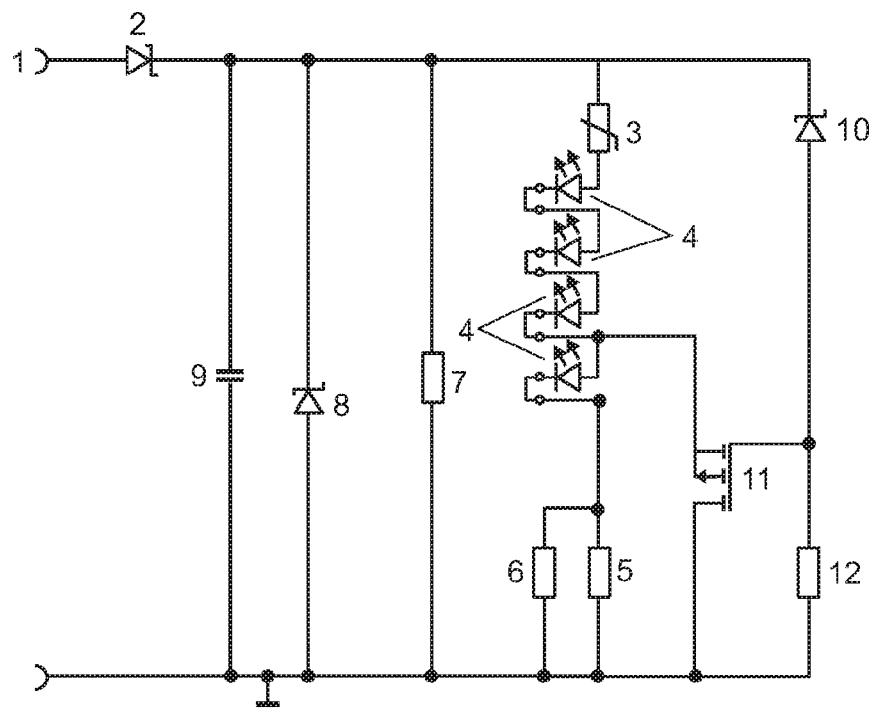
FIG. 3 shows a schematic circuit diagram of an illumination device according to the third embodiment.

A circuit as shown in FIG. 3 according to the illumination device in accordance with the third embodiment has the same function as that in FIG. 1 and FIG. 2. In the circuit according to FIG. 3, one of the light-emitting diodes of the semiconductor light source arrangement 4 and the resistors 5, 6 are bridged in the event of an excessively low input voltage in order to increase the current for the remaining light-emitting diodes of the semiconductor light source arrangement 4 and to achieve a greater luminosity (lumen) thereby.

Figure 4:
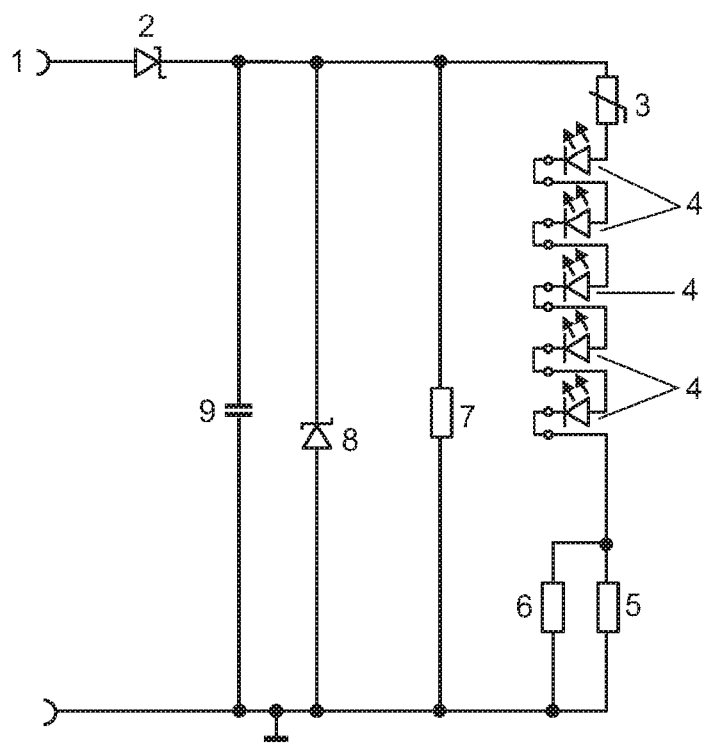
FIG. 4 shows a schematic circuit diagram of an illumination device according to the fourth embodiment.

The circuit in accordance with FIG. 4 according to the illumination device in accordance with the fourth embodiment of the invention has the same function as that according to FIG. 1, but the semiconductor light source arrangement of the illumination device has five light-emitting diodes connected in series, rather than four.

Figure 5:
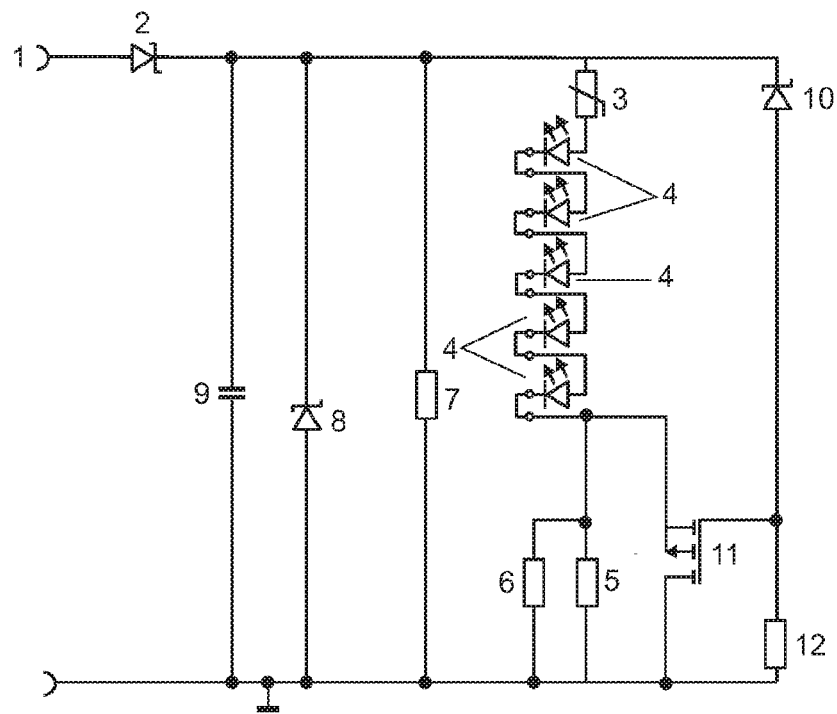
FIG. 5 shows a schematic circuit diagram of an illumination device according to the fifth embodiment.

The fifth embodiment of the illumination device, depicted in FIG. 5, has a semiconductor light source arrangement having five light-emitting diodes connected in series and corresponds, in terms of function, to the circuit according to FIG. 2.

Figure 6:
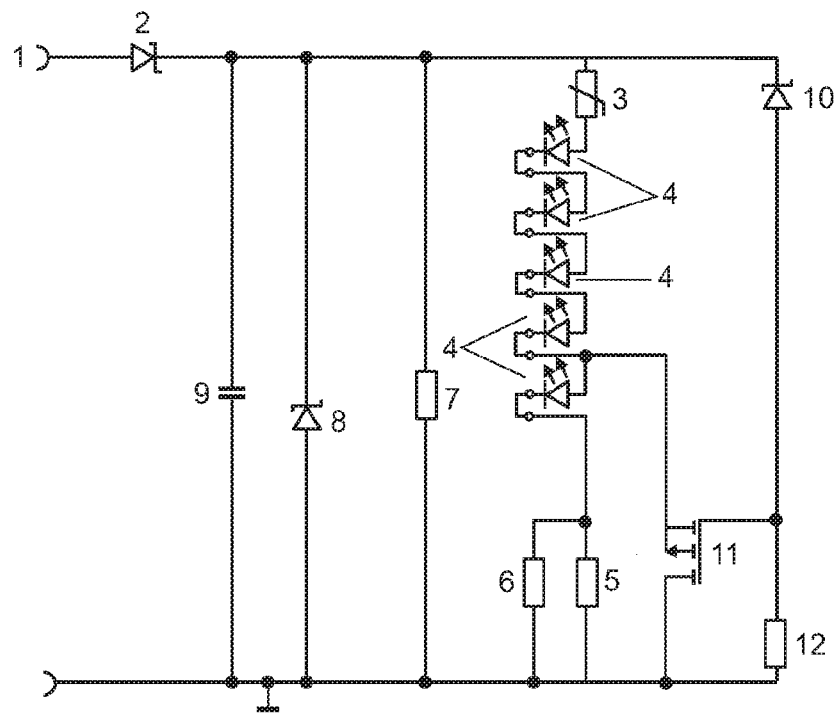
FIG. 6 shows a schematic circuit diagram of an illumination device according to the sixth embodiment.

The sixth embodiment of the illumination device, depicted in FIG. 6, has a semiconductor light source arrangement having five light-emitting diodes connected in series and corresponds, in terms of function, to the circuit according to FIG. 3.

Figure 7:
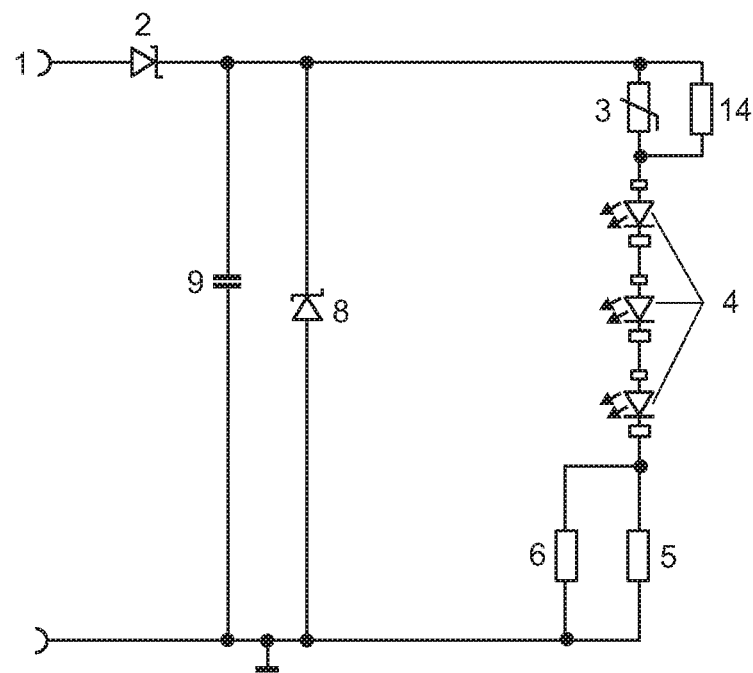
FIG. 7 shows a schematic circuit diagram of an illumination device according to the seventh embodiment.

In a circuit according to the seventh embodiment of the illumination device, depicted in FIG. 7, the semiconductor light source arrangement 4 has three light-emitting diodes connected in series. Its function corresponds to the basic function of the circuit according to FIG. 1, but differs by a resistor 14 which is connected in parallel with the PTC thermistor 3. The nominal current is set in the light-emitting diodes of the semiconductor light source arrangement having a higher forward voltage with the aid of the resistor 14.

Figure 8:
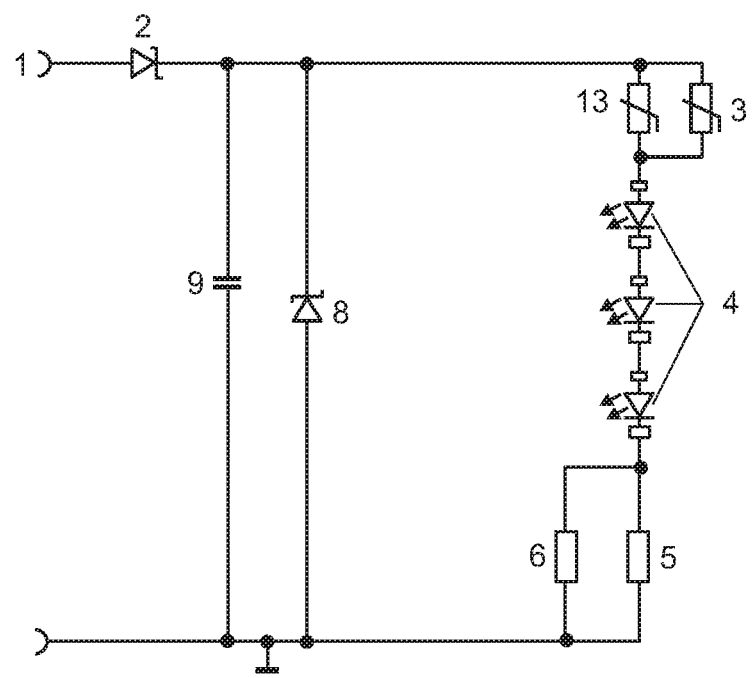
FIG. 8 shows a schematic circuit diagram of an illumination device according to the eighth embodiment.

A circuit as shown in FIG. 8 in accordance with the eighth embodiment of the illumination device has a semiconductor light source arrangement 4 having three light-emitting diodes connected in series. Its function corresponds to the circuit according to FIG. 1, but differs by a PTC thermistor 13 which is connected in parallel with the PTC thermistor 3.

The nominal current is set in light-emitting diodes having a higher forward voltage and temperature with the aid of the PTC thermistor 13.

Figure 9:
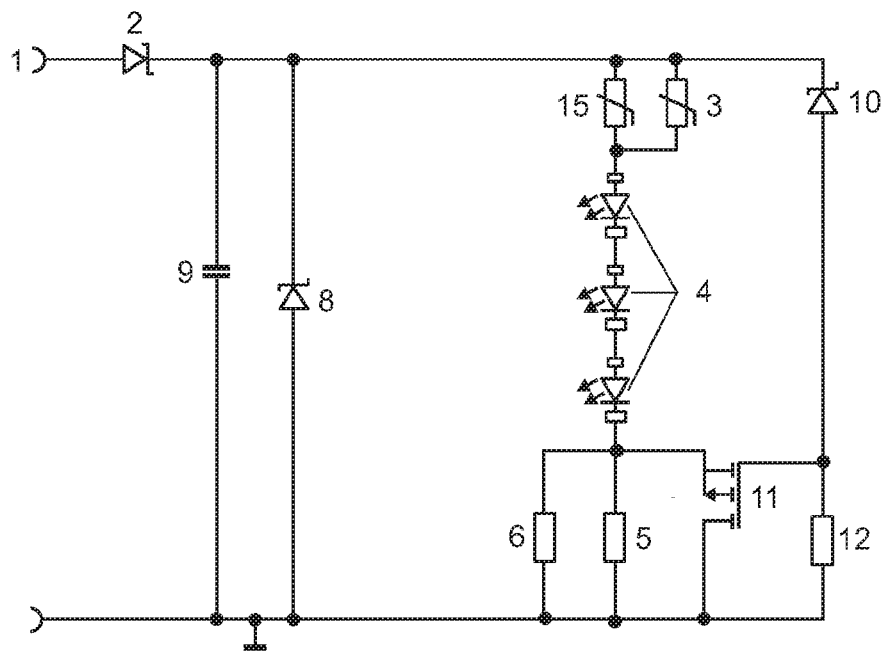
FIG. 9 shows a schematic circuit diagram of an illumination device according to the ninth embodiment.

The circuit according to FIG. 9 in accordance with the ninth embodiment of the illumination device has a semiconductor light source arrangement 4 having three light-emitting diodes connected in series. It has the same function as the circuit arrangement according to the fifth embodiment of the illumination device according to the invention, depicted in FIG. 5.

Figure 10:
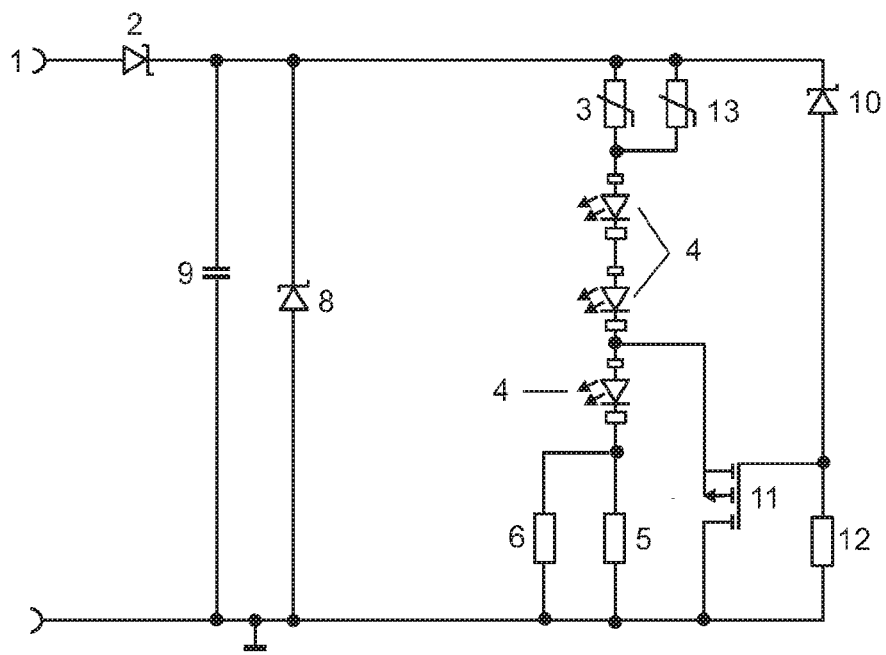
FIG. 10 shows a schematic circuit diagram of an illumination device according to the tenth embodiment.

The circuit in FIG. 10 in accordance with the tenth embodiment of the illumination device has a semiconductor light source arrangement 4 having three light-emitting diodes connected in series. It has the same function as the circuit arrangement according to the sixth embodiment of the illumination device, depicted in FIG. 6.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An illumination apparatus for a motor vehicle, the illumination device comprising:
   at least one semiconductor light source arrangement;
   a controller configured to regulate or control the supply current for the at least one semiconductor light source arrangement, the controller comprising at least one resistance element with a temperature-dependent resistance value;
   at least one suppressor diode which is connected in a parallel branch to the at least one semiconductor light source arrangement; and
   at least one capacitor connected in parallel with the at least one suppressor diode.

2. The illumination device of claim 1,
   wherein the controller comprises at least one further resistance element.

3. The illumination device of claim 1,
   wherein the controller comprises at least one transistor.

4. The illumination device of claim 1,
   wherein the controller comprises at least one Zener diode.

5. An illumination apparatus for a motor vehicle, the illumination device comprising:
   at least one semiconductor light source arrangement;
   means for regulating or controlling the supply current for the at least one semiconductor light source arrangement, the means comprising at least one resistance element with a temperature-dependent resistance value;
   at least one suppressor diode which is connected in a parallel branch to the at least one semiconductor light source arrangement; and
   at least one capacitor connected in parallel with the at least one suppressor diode.

6. The illumination device of claim 5,
   wherein the means comprises at least one further resistance element.

7. The illumination device of claim 5,
   wherein the means comprises at least one transistor.

8. The illumination device of claim 5,
   wherein the means comprises at least one Zener diode.

* * * * *